United States Patent
Davis

(10) Patent No.: US 12,540,834 B2
(45) Date of Patent: Feb. 3, 2026

(54) AUTOMATED RECOGNITION AND PERFORMANCE OF VEHICLE TO CAMERA CALIBRATION

(71) Applicant: Deere & Company, Moline, IL (US)

(72) Inventor: Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 413 days.

(21) Appl. No.: 18/299,339

(22) Filed: Apr. 12, 2023

(65) Prior Publication Data

US 2024/0344850 A1 Oct. 17, 2024

(51) Int. Cl.
   *G01C 25/00* (2006.01)
   *G01C 21/00* (2006.01)
   *G06T 7/80* (2017.01)

(52) U.S. Cl.
   CPC ......... *G01C 25/00* (2013.01); *G01C 21/3837* (2020.08); *G06T 7/80* (2017.01)

(58) Field of Classification Search
   CPC ...... G01C 25/00; G01C 21/3837; G06T 7/80; G06T 2207/10028; G06T 2207/30188; G06T 2207/30244
   See application file for complete search history.

(56) References Cited

U.S. PATENT DOCUMENTS

| | | |
|---|---|---|
| 6,282,317 B1 | 8/2001 | Luo et al. |
| 7,035,461 B2 | 4/2006 | Luo et al. |
| 7,610,122 B2 | 10/2009 | Anderson |
| 7,680,340 B2 | 3/2010 | Luo et al. |
| 7,860,320 B2 | 12/2010 | Luo et al. |
| 8,520,897 B2 | 8/2013 | Boncyk et al. |
| 8,712,144 B2 | 4/2014 | Mas et al. |
| 8,855,405 B2 | 10/2014 | Mas et al. |
| 8,965,104 B1 | 2/2015 | Hickman et al. |
| 9,158,789 B2 | 10/2015 | Garrett et al. |
| 9,213,905 B2 | 12/2015 | Lange et al. |
| 9,642,305 B2 | 5/2017 | Nykamp et al. |

(Continued)

OTHER PUBLICATIONS

Extended European Search Report and Written Opinion issued in European Patent Application No. 24163066.4 dated Sep. 4, 2024, in 09 pages.

*Primary Examiner* — Yuen Wong
(74) *Attorney, Agent, or Firm* — Gary L. Montle; Lucian Wayne Beavers; Patterson Intellectual Property Law, PC

(57) ABSTRACT

A system and method of automated vehicle to sensor calibration includes, during operation of a work vehicle having sensors located thereon, each sensor having a stored location and/or orientation relative to the vehicle, automatically determining via first sensor inputs an orientation of the ground surface relative to vehicle orientation, and automatically mapping via second sensor inputs one or more persistent external references to a vehicle coordinate frame. At least upon determining that the ground surface orientation and the mapped persistent external references satisfy specified conditions, a vehicle to sensor calibration mode is automatically initiated, including receiving actual inputs from a first (e.g., uncalibrated) sensor, which may be one of the sensors having stored locations and/or orientations prior to calibration, and selectively adjusting parameters of the first sensor based at least in part on the mapped persistent external references with respect to the actual inputs from the first sensor.

18 Claims, 2 Drawing Sheets

(56) References Cited

U.S. PATENT DOCUMENTS

| | | | |
|---|---|---|---|
| 9,699,968 B2 | 7/2017 | Posselius et al. | |
| 9,797,980 B2 | 10/2017 | Smitherman | |
| 9,813,512 B2 | 11/2017 | Wilbur et al. | |
| 10,019,790 B2 | 7/2018 | Bonefas et al. | |
| 10,255,670 B1 * | 4/2019 | Wu | H04N 7/183 |
| 10,401,501 B2 | 9/2019 | Wood | |
| 10,453,165 B1 | 10/2019 | Kostov et al. | |
| 10,474,926 B1 | 11/2019 | Dirac et al. | |
| 10,733,752 B2 | 8/2020 | Hageman et al. | |
| 10,762,605 B2 | 9/2020 | Chui et al. | |
| 11,178,818 B2 | 11/2021 | Brammeier et al. | |
| 11,234,366 B2 | 2/2022 | Darr et al. | |
| 11,240,961 B2 | 2/2022 | Anderson et al. | |
| 11,479,262 B2 | 10/2022 | Harrison | |
| 2010/0194886 A1 | 8/2010 | Asari et al. | |
| 2017/0009578 A1 | 1/2017 | Barimani et al. | |
| 2017/0233955 A1 | 8/2017 | Berning et al. | |
| 2018/0120133 A1 | 5/2018 | Blank et al. | |
| 2018/0165833 A1 | 6/2018 | Inoue et al. | |
| 2019/0061623 A1 | 2/2019 | Borkowski | |
| 2019/0174666 A1 | 6/2019 | Manternach | |
| 2020/0019778 A1 | 1/2020 | Frei et al. | |
| 2020/0202127 A1 | 6/2020 | Chen et al. | |
| 2020/0379479 A1 | 12/2020 | Dima et al. | |
| 2021/0231453 A1 | 7/2021 | Colosky et al. | |
| 2021/0243936 A1 | 8/2021 | Vandike et al. | |
| 2021/0289701 A1 | 9/2021 | White et al. | |
| 2021/0337729 A1 | 11/2021 | O'Connor et al. | |
| 2022/0113729 A1 | 4/2022 | Vandike et al. | |

\* cited by examiner

AUTOMATED RECOGNITION AND PERFORMANCE OF VEHICLE TO CAMERA CALIBRATION

FIELD OF THE DISCLOSURE

The present disclosure relates to vehicle to sensor calibration. More particularly, one or more embodiments of a system and/or method according to the present disclosure relate to automated recognition that calibration is required for one or more sensors on a work vehicle, and/or that predetermined conditions for such calibration are satisfied, and further automatically performing a calibration routine for the one or more sensors.

BACKGROUND

For camera-based vehicle automation or autonomy solutions, vehicle to camera calibration is generally required to understand the mechanical tolerances that exist between the actuation solution (e.g., vehicle steering) and the camera's mounting angle with respect to the vehicle, for example a work vehicle or machine.

In conventional implementations, for example in the agricultural space, a user is required to selectively enter a calibration mode and then manually tell the system that certain constraints are met. Predetermined constraints for vehicle to camera calibration may typically include for example that the ground is sufficiently flat, and that external reference points such as crop rows associated with a field in which the work vehicle travels exist and are sufficiently straight to perform a calibration routine. During the manually initiated calibration routine, the external reference points (e.g., crop rows) are detected and after a long enough period to detect the rows, the effective angle of the camera with respect to the vehicle is calculated.

Unfortunately, the user may be unable to recognize when calibration parameters need to be updated for a given camera, or the user may be unable to effectively initiate a calibration procedure during operation of the vehicle or machine, especially in contexts or implementations having a large number of cameras onboard the vehicle.

BRIEF SUMMARY

The current disclosure provides an enhancement to such conventional methods, at least in that the ground plane detection and external reference points (e.g., crop row or other object relevant to the context) are performed automatically in the background rather than an active step that a user must perform. Self-calibrating, and/or self-detecting that calibration of a camera is necessary, during operation of the work vehicle may not only reduce the burden on the operator, but also better ensure reliable and accurate performance of all cameras onboard the work vehicle throughout the operation.

As part of an automated system and/or methodology as disclosed herein, a depth capability may be provided through any one or more of stereo cameras, light detection and ranging (lidar) sensors, laser sensors, and the like to detect the ground plane surface and determine its orientation with respect to a current orientation of the vehicle as further sensed by, e.g., a global position sensing (GPS) sensor, an inertial measurement unit (IMU), or the like.

The depth capability can be combined with one or more perception sensors such as, e.g., cameras, lidar, etc., which can also then detect persistent external reference points such as defined rows or objects with refined edges that are (or extend) in the distance or otherwise continuous from frame to frame (e.g., lines on a road).

For calibration routines where multiple cameras are used, a detailed location map of the persistent external references may be available, or otherwise be generated and shared, to other camera sensors for those other cameras to determine the location of a new or shifted camera sensor.

In various embodiments of a system and method as disclosed herein, the above-referenced capabilities may enable a work vehicle or other machine to calibrate one or many cameras in the background whenever the appropriate conditions are met to self-detect the camera(s) to vehicle orientation, or to the other cameras already calibrated to the vehicle. This could also help account for movement of the camera or replacement of the camera without necessarily requiring a calibration.

According to a first embodiment, a method of automated vehicle to sensor calibration is disclosed herein. During operation of a work vehicle having a plurality of sensors located thereon, each of the plurality of sensors having one or more of a stored location and a stored orientation relative to the work vehicle, the method includes automatically determining, via first inputs from one or more of the plurality of sensors, an orientation of a ground surface across which the work vehicle travels relative to an orientation of the work vehicle, and automatically mapping, via second inputs from one or more of the plurality of sensors, one or more persistent external references to a coordinate frame associated with the work vehicle. The method further includes, at least upon determining that the orientation of the ground surface and the mapped one or more persistent external references satisfy one or more specified conditions, automatically initiating for a first sensor a vehicle to sensor calibration mode comprising receiving actual inputs from the first sensor, and selectively adjusting one or more parameters of the first sensor based on the mapped one or more persistent external references with respect to the actual inputs from the first sensor.

In one exemplary aspect according to the above-referenced first embodiment, the first sensor may be a camera, for example a stereo camera arranged with a field of view generally corresponding at least to a direction of travel for the work vehicle during operation.

In another exemplary aspect according to the above-referenced first embodiment, the first sensor may be one of the plurality of sensors, and the vehicle to sensor calibration mode for the first sensor may comprise: comparing the actual inputs from the first sensor to corresponding expected inputs based on the one or more of the stored location and the stored orientation for the first sensor; and selectively adjusting the one or more parameters of the first sensor based at least in part on a difference between the actual inputs and the expected inputs.

In another exemplary aspect according to the above-referenced first embodiment, the vehicle to sensor calibration mode may be automatically initiated further upon determining a new location of the first sensor.

In another exemplary aspect according to the above-referenced first embodiment, the vehicle to sensor calibration mode may be automatically initiated further upon determining a new orientation of the first sensor.

In another exemplary aspect according to the above-referenced first embodiment, selectively adjusting one or more parameters of the first sensor may include adjusting the one or more of the stored location and the stored orientation of the first sensor to align the actual inputs and the expected inputs.

In another exemplary aspect according to the above-referenced first embodiment, selectively adjusting one or more parameters of the first sensor may include adjusting one or more calibration settings associated with the first sensor to align the actual inputs and the expected inputs.

In another exemplary aspect according to the above-referenced first embodiment, the actual inputs from the first sensor may be compared to expected inputs based at least on a stored orientation of the first sensor relative to respective stored orientations for each of one or more other sensors of the plurality of sensors.

In another exemplary aspect according to the above-referenced first embodiment, the actual inputs from the first sensor may be compared to expected inputs based at least on an orientation of the work vehicle.

In another exemplary aspect according to the above-referenced first embodiment, the method may include: retrieving a stored map identifying the one or more persistent external references in a coordinate frame independent of the work vehicle; converting parameters associated with the one or more persistent external references into the coordinate frame associated with the work vehicle; confirming that dynamically mapped parameters associated with the one or more persistent external references via the second inputs align with the converted parameters from the stored map; and during the calibration mode, determining a location and/or orientation of the first sensor to align inputs corresponding to the one or more persistent external references received from the first sensor with the converted parameters from the stored map.

In another exemplary aspect according to the above-referenced first embodiment, the orientation of the ground surface may be automatically determined by fusing the first inputs from: one or more sensors configured to detect relative depth parameters corresponding to the ground surface; and one or more sensors configured to detect an orientation of the work vehicle in the coordinate frame independent of the work vehicle.

In another exemplary aspect according to the above-referenced first embodiment, the one or more specified conditions to be satisfied may include a flatness of the ground surface.

In another exemplary aspect according to the above-referenced first embodiment, the one or more persistent external references may include a crop row extending along a trajectory parallel to a direction of travel of the work vehicle.

In another exemplary aspect according to the above-referenced first embodiment, the one or more specified conditions to be satisfied may include a duration of persistence for the one or more persistent external references.

In a second embodiment as disclosed herein, a work vehicle includes a plurality of sensors located thereon, and a controller functionally linked to each of the plurality of sensors and to data storage having stored thereon information, for each of the plurality of sensors, corresponding to one or more of a location and an orientation relative to the work vehicle. The controller is configured to direct the performance of operations corresponding to steps in a method according to any one of the above-referenced method embodiment and associated exemplary aspects.

In a third embodiment as disclosed herein, a computing system is provided for automated vehicle to sensor calibration, the system comprising one or more processors functionally linked to a plurality of sensors located on a work vehicle, and to data storage having stored thereon respective information for each of the plurality of sensors corresponding to one or more of a stored location and a stored orientation relative to the work vehicle. The one or more processors may be located onboard the work vehicle, or remotely for example in the context of a cloud server application, a mobile user device, or the like, or a combination of such processors in a distributed computing environment. The one or more processors are configured to direct the performance of operations corresponding to steps in a method according to any one of the above-referenced method embodiment and associated exemplary aspects.

Numerous objects, features and advantages of the embodiments set forth herein will be readily apparent to those skilled in the art upon reading of the following disclosure when taken in conjunction with the accompanying drawings.

DETAILED DESCRIPTION

The implementations disclosed in the above drawings and the following detailed description are not intended to be exhaustive or to limit the present disclosure to these implementations.

Figure 1:
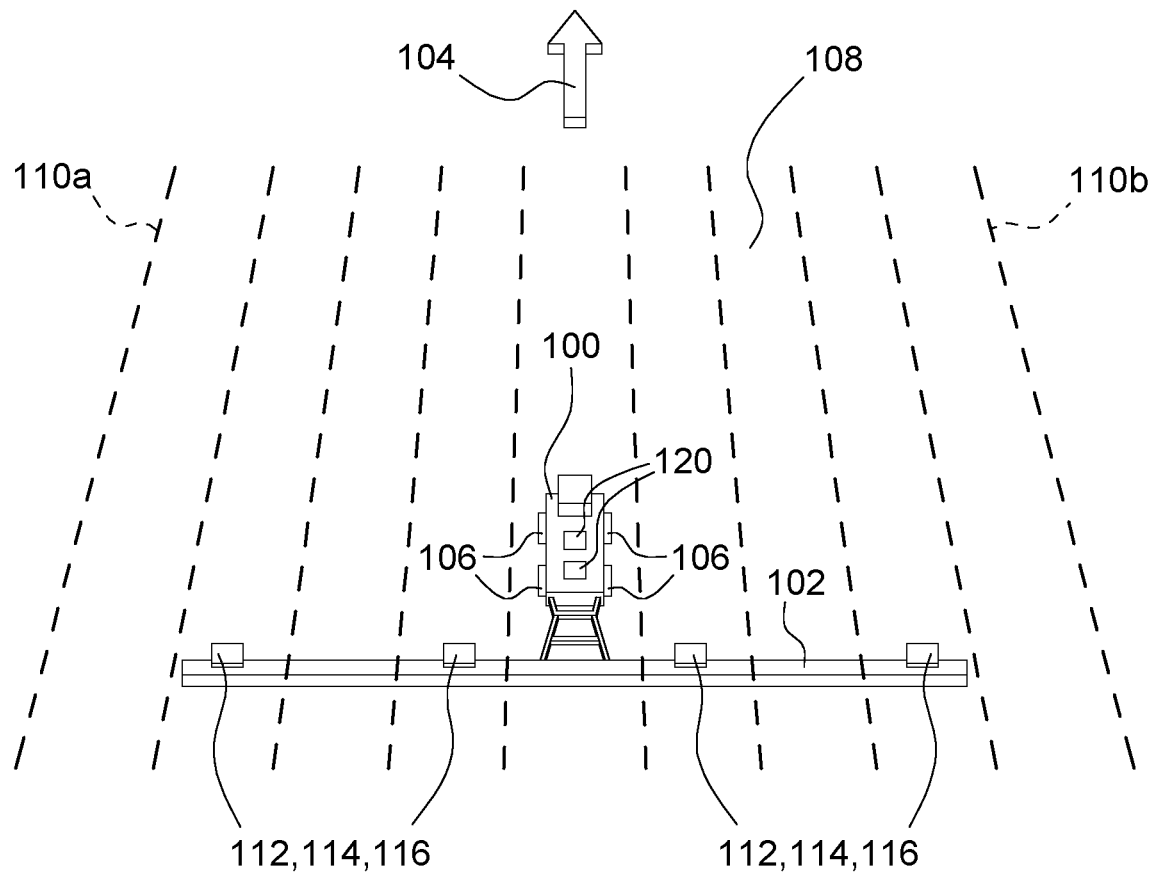
FIG. 1 is an overhead view representing an embodiment of a work vehicle as disclosed herein and configured for automated vehicle to sensor calibration with respect to sensors (e.g., cameras) mounted thereon.

FIG. 1 illustrates an embodiment of a work vehicle 100, for example an agricultural tractor or sprayer. This disclosure also potentially applies to other types of work vehicles or machines in agriculture, construction, forestry, road building, and the like, unless otherwise specifically noted herein. The work vehicle 100 as illustrated is drawing a rear-mounted implement 102 such as for example a boom, but in various embodiments the implement 102 may instead be front-mounted in a working direction 104 as opposed to behind the work vehicle in the working direction as illustrated.

The work vehicle 100 may typically include a frame carried on a plurality of wheels or other ground engaging units 106. An engine or other power source (not shown) drives the ground engaging units 106 to move the work vehicle across a ground surface 108 in at least the working direction 104, for example through a field including a plurality of crop rows 110. The working direction 104 may also be referred to as the heading of the tractor 100.

Only two crop rows 110 are shown for illustrative purposes, but it may be understood that a number of other crop rows 110 may be present and parallel with the two illustrated crop rows 110 in the working direction 104. The crop rows 110 are illustrated in a non-parallel arrangement, representing a perspective view of the respective crop rows 110 from a substantially central position. If the perspective were to be shifted to a distal position on the left side of the implement 102, the first illustrated crop row 110a would appear to extend substantially straight ahead while the second illustrated crop row 110b would be even more angular in appearance. And vice-versa, if the perspective were to be shifted to a distal position on the right side of the implement 102, the second illustrated crop row 110b would appear to extend substantially straight ahead while the first illustrated crop row 110a would be even more angular in appearance.

The implement 102 may generally be described as having a boom having a width extending laterally with respect to the working direction 104. In some embodiments, for example wherein the implement 102 is provided for engaging and working the ground surface 108, a plurality of ground engaging units may be provided for supporting a frame of the implement with respect to the ground surface 108. In other embodiments, the boom is suspended from the frame of the work vehicle 100 and does not directly engage the ground surface 108. While the implement 102 is shown having a width substantially in excess of a width of the frame of the work vehicle 100, this context is exemplary for the purpose of describing an invention herein, and various alternative configurations are considered to be within the scope of the present disclosure.

Depending upon the type of implement 102, and/or the type of work being performed by the implement, a working unit provided therewith may be of different types. For example, for a mower conditioner the working unit may be a cutting head. For a side-drawn baler, the working unit may include a hay pick up device. For a sprayer, the working unit may include a plurality of spray nozzles. An implement 102 as disclosed herein is by no means limited to implements of these types, and further description regarding its implementation is not required for a complete understanding of the invention to one of skill in the art.

Various sensors 112, 114, 116 may be mounted at locations about the work vehicle 100, including on the frame of the work vehicle 100, on a left distal end of the implement 102, and on a right distal end of the implement 102 as illustrated in FIG. 1, but it should be understood that a number of sensors as further described herein may be mounted at various locations with respect to the work vehicle 100 itself as well as along the width (i.e., lateral length) of the implement 102.

One or more of the above-referenced sensors may be sensors providing depth functionality, wherein output signals provided from a first set of sensors 112 (ground surface orientation sensors 112) may be used to determine an orientation of the ground surface 108 relative to an orientation of the work vehicle 100. Exemplary ground surface orientation sensors 112 may include cameras, light detection and ranging (lidar) sensors, laser sensors, and the like to detect the ground plane surface and determine its orientation with respect to a current orientation of the vehicle as further sensed by a second set of sensors 114 (vehicle orientation sensors 114), e.g., a global position sensing (GPS) sensor, an inertial measurement unit (IMU), or the like.

A third set of sensors 116 (perception sensors 116) such as, e.g., cameras, lidar, etc., may be used to detect persistent external reference points such as the crop rows 110 or other objects with refined edges that are (or extend) in the distance or otherwise continuous from frame to frame (e.g., lines on a road).

As noted above, the sensors 112, 114, 116 may include cameras provided on one or more locations on the work vehicle 100 and/or along the implement 102, not limited to the illustrated and exemplary locations in FIG. 1, and may for example be mounted on dedicated camera mounts. In an embodiment, the camera mount for a given camera may be pivotable about at least one primarily vertical first axis. This allows the orientation of a field of view of the camera to be selectively adjusted about the first axis so that the field of view can be oriented in a desired, e.g. primarily forward facing, direction. Orientation of the field of view may be defined as the orientation of a central axis of the field of view. For example, the central axis of the field of view may be oriented such that the field of view is dependent upon a change in the moving direction 104 of the work vehicle 100.

As used herein if an axis is described as "primarily" vertical, this means that the axis is closer to vertical than to horizontal, i.e. the axis is within a range of plus or minus 45 degrees from vertical. If an axis is described as "primarily" horizontal, this means that the axis is closer to horizontal than it is to vertical, i.e. the axis is within a range of plus or minus 45 degrees from horizontal. Similarly, if a direction or orientation is described as "primarily" forward, the direction is within a range of plus or minus 45 degrees from the working (forward) direction 104. Thus, when the field of view is described as being oriented in a primarily forward facing direction, this means that a horizontal component of the central axis lies within plus or minus 45 degrees of the forward direction when the forward direction is horizontal.

Figure 2:
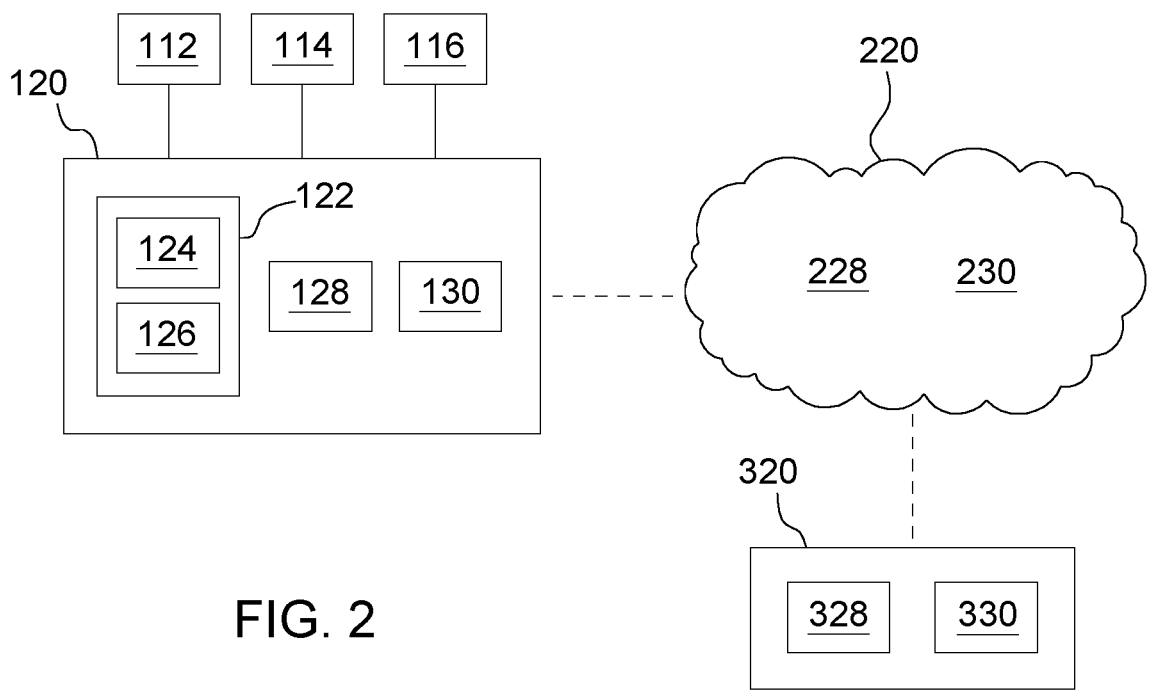
FIG. 2 is a graphical diagram representing an embodiment of a system as disclosed herein and configured for automated vehicle to sensor calibration with respect to sensors (e.g., cameras) mounted on a work vehicle.

Referring next to FIG. 2, the sensors 112, 114, 116 may be functionally linked to a controller 120 associated with the work vehicle 100, and in some embodiments further via a communications network to a remote server 220, such as for example in the context a cloud server platform, and/or one or more remote computing devices 320. The output signals from the cameras, for example, may be provided directly to the controller 120 or via intervening components for analog-to-digital conversion and/or video interface (not shown). The controller 120 may typically be located in an operator cab of the work vehicle 100 but may in certain embodiments be located on the implement 102, elsewhere within the work vehicle, or even externally with respect to the work vehicle 100 within altering the scope of the present disclosure. The controller 120 may generally be configured to automatically and/or user-selectively perform operations as more particularly described below with respect to method 400.

Various operations, steps or algorithms as described in connection with the controller 120, server 220, and/or remote computing device 320 can be embodied directly in hardware, in a computer program product such as one or more software modules executed by one or more of respective processors 128, 228, 328, or in a combination thereof. The computer program product can reside in one or more of data storage devices 130, 230, 330 such as RAM memory, flash memory, ROM memory, EPROM memory, EEPROM memory, registers, hard disk, a removable disk, or any other form of computer-readable medium known in the art. An exemplary computer-readable medium can be coupled to a respective processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein at least with respect to processors 128, 228, 328 may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The controller 120 as shown in FIG. 2 is further functionally linked to a user interface 122 including a display unit 124 for selectively displaying information to the operator, and further typically configured as or including an input device 126 for receiving inputs from the operator. The display unit 124 and the input device 126 may be collectively provided as a module with respect to a user interface 122, including for example a touchscreen to enable user manipulation and/or inputs corresponding to displayed elements. The controller 120 and user interface 122 may be discrete components, or may still further collectively be provided as parts of the same vehicle control unit. The controller 120 may further be functionally linked (via the user interface 122 or otherwise via discrete data connections) to receive inputs with respect various controls or user inputs (e.g., a steering wheel, joysticks, levers, buttons) for operating the work vehicle 100 and/or the associated implement 102. Such an onboard interface may be coupled to a control system via for example a CAN bus arrangement or other equivalent forms of electrical and/or electro-mechanical signal transmission. Another form of user interface (not shown) may take the form of a display that is generated on a remote (i.e., not onboard) computing device 320, which may display outputs such as status indications and/or otherwise enable user interaction such as the providing of inputs to the system. In the context of a remote user interface, data transmission between, for example, a vehicle control system and the user interface may take the form of a wireless communications system and one or more associated components as are conventionally known in the art.

The display portion of the user interface 122 may be configured to receive output signals from the controller 120, for example representative of signals received from one or more of sensors 112, 114, 116, and further display or otherwise implement such signals in the form of audio, visual, or audio-visual indicia for user review, manipulation, analysis, alerting, and the like.

Figure 3:
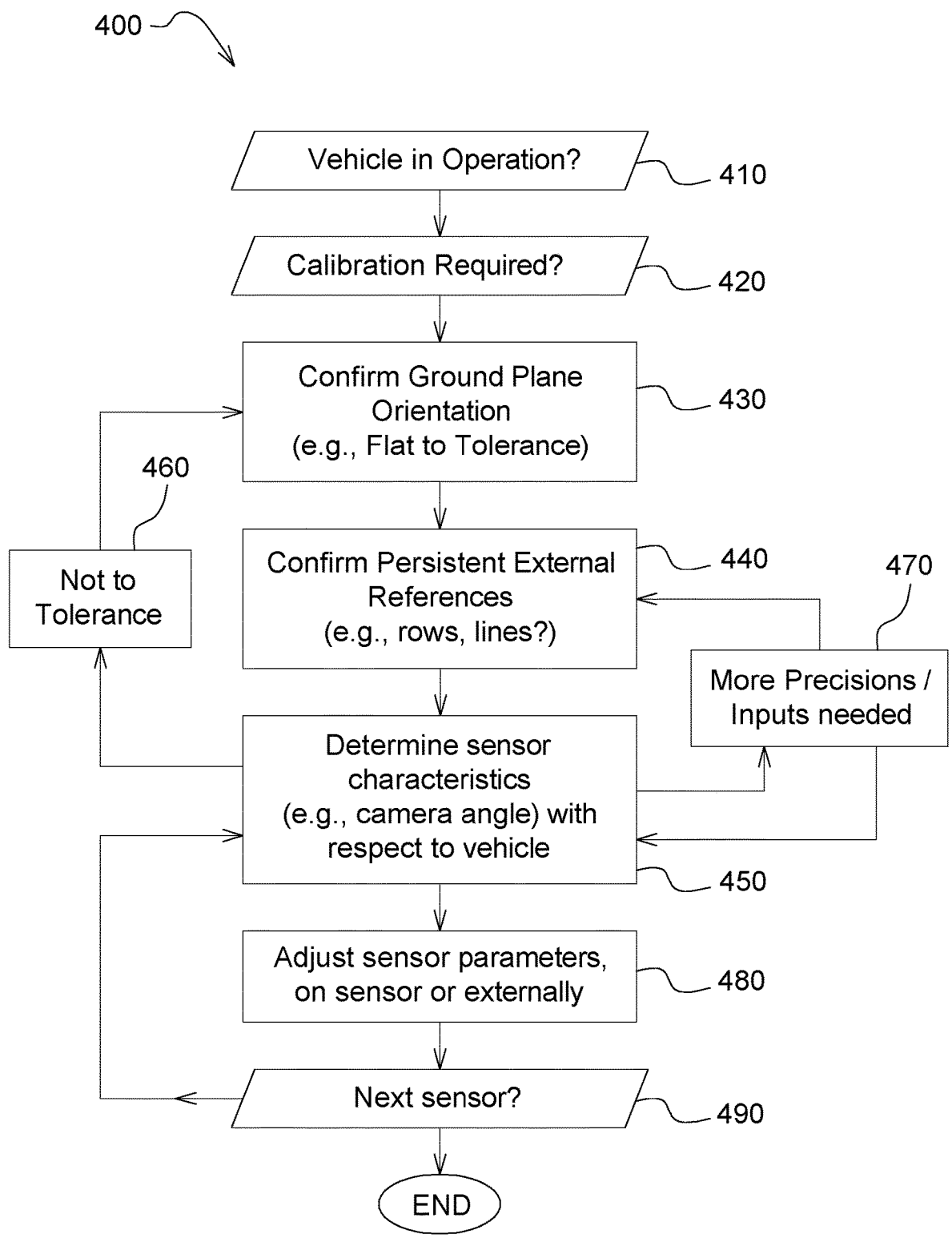
FIG. 3 is a flowchart representing an embodiment of a method as disclosed herein for automated vehicle to sensor calibration with respect to sensors (e.g., cameras) mounted on a work vehicle.

Referring next to FIG. 3, an embodiment of a method 400 as disclosed herein may enable a work vehicle 100 as described above, or other equivalent machines within the scope of the present disclosure, to calibrate one or many sensors such as cameras associated with the work vehicle 100 in the background whenever the appropriate conditions are met to self-detect respective camera to vehicle orientations, or orientation of a given camera with respect to the other cameras already calibrated to the vehicle.

In the illustrated embodiment, a first step 410 includes determining that the work vehicle 100 is presently in operation, such as for example traveling in a forward direction 104 across a ground surface 108 such as a crop field. In certain embodiments, this step 410 may be omitted, and it may be appreciated that other steps in the method 400 as further described herein may also be omitted, as the specific compilation of steps and the chronological order of their performance is not required for execution of the method 400 unless otherwise specifically stated or technically necessary. For example, a second step 420 as illustrated in FIG. 3 includes determining whether calibration is required for one or more cameras on the work vehicle 100. In various embodiments, such a determination that one or more cameras are not properly calibrated may be made automatically as a prerequisite for initiating a calibration mode including subsequent steps in the method 400. In other embodiments, numerous steps associated with a calibration mode may be performed automatically during operation and used for determining whether a change in calibration settings is appropriate for one or more cameras. In still further embodiments, a signal that one or more cameras require calibration, or at least that the calibration settings should be confirmed, may be provided manually by a user, for example upon adding, moving, or adjusting the position of the respective cameras.

In an embodiment, the method 400 and more particularly step 420 may include determining that a camera has been newly added to the work vehicle, or moved from a first location to a second location on the work vehicle, or that a change in orientation of the camera has been detected and not otherwise accounted for in stored settings, and therefore initiate a calibration mode or a confirmation mode for determining whether the current calibration settings for the camera require adjustment. Each camera may be provided with unique identifiers, wherein output signals from a particular camera include the unique identifier and the controller 120 or other intermediary or alternative processing unit determines that the identifier is not recognized in association with the work vehicle, or in that particular location. Each camera, or an associated camera mount, may for example include an image sensing component and also a position and/or orientation sensing component such that changes in the position and/or orientation of the camera may be determined and accounted for automatically, detected to trigger further processing and possible calibration, or the like.

The method 400 as illustrated in FIG. 3 further includes determining whether threshold conditions have been satisfied for confirming that calibration is required and/or performing calibration adjustments with respect to one or more cameras.

Step 430 includes determining an orientation of the plane of the ground surface 108 relative to an orientation of the work vehicle. With reference to the work vehicle 100 and controller 120 described above, inputs from one or more ground surface orientation sensors 112 may for example be provided in association with a first coordinate frame (e.g., global, or otherwise independent of the work vehicle), whereas inputs from one or more vehicle orientation sensors 114 may for example be provided in association with a second coordinate frame (e.g., relative to at least a portion of the work vehicle). Sensor fusion techniques may preferably be applied to yield a common reference frame for each input, utilizing Kalman filtering techniques as but one non-limiting example, particularly where different types of inputs from complementary sensors (e.g., cameras, lidar, laser, radar) are provided.

If the orientation of the ground plane or the work vehicle orientation have not been determined, alone or for example in the context of a common reference frame after fusion of the respective inputs, the method 400 may typically require repeating step 430 until such determinations may be appropriately made, at least temporarily suspending the calibration mode, generating a prompt to manually indicate that the relative orientation is at least presently indeterminate, or the like.

If the ground surface orientation relative to the work vehicle orientation is not determined to satisfy a predetermined threshold condition, such as for example that an approximated plane of the ground surface 108 is sufficiently flat to continue the process, not only with respect to a portion being presently traversed but also across a portion yet to be traversed and within the field of view of one or more cameras, the method 400 may typically require repeating step 430 until the condition may be satisfied, at least temporarily suspending the calibration mode, generating a prompt to manually indicate that the condition is not satisfied, or the like. The requisite degree or consistency associated with the specified condition may be variable for a given embodiment depending on any number of factors, not limited for example to the imaging conditions such as the number of cameras, arrangement, elevation, etc. The specified condition as a sufficiently flat ground plane may be typical but also exemplary, in that alternative or additional conditions may be specified within the scope of the present disclosure.

Step 440 includes determining persistent external references with respect to the work vehicle via inputs from one or more perception sensors 116, and further mapping those persistent external references into a coordinate frame independent of the work vehicle. Examples of such persistent external references may include crop rows, lines on a road, or the like, and may typically relate to references having refined edges and external to the work vehicle which extend in a direction parallel to a working direction of the work vehicle during operation. As previously noted, the persistent external references will extend to a horizon along substantially different paths through a field of view for each sensor 116 having different locations, orientations, and perspectives generally. Accordingly, sensor fusion techniques may preferably be applied to signals from the respective perception sensors 116 as needed to determine a trajectory for a persistent external reference (e.g., single crop row) with respect to a common reference frame independent of the work vehicle.

As with the preceding step 430, if one or more persistent external references have not been determined, alone or for example in the context of a common reference frame after fusion of the respective inputs, the method 400 may typically require repeating step 440 until such determinations may be appropriately made, at least temporarily suspending the calibration mode, generating a prompt to manually indicate that the relative orientation is at least presently indeterminate, or the like.

If the one or more persistent external references are not determined to satisfy a predetermined threshold condition, such as for example that the identified crop rows are sufficiently "persistent" (e.g., straight, defined, or the like) to continue the process, for at least a requisite portion of the field of view of one or more sensors 116, the method 400 may typically require repeating step 440 until the condition may be satisfied, at least temporarily suspending the calibration mode, generating a prompt to manually indicate that the condition is not satisfied, or the like. The requisite trajectory, definition, duration of persistence, or the like as associated with the specified condition may be variable for a given embodiment depending on any number of factors, not limited for example to the imaging conditions such as the number of cameras, arrangement, elevation, etc.

The method 400 as illustrated in FIG. 3 continues with a step 450 of determining, for at least one camera onboard the work vehicle, at least one position characteristic relative to the work vehicle. The at least one camera in the context of step 450 may be referred to in the upcoming passages as a "subject camera" with respect to the calibration mode. For example, captured images from the subject camera may include at least one of the persistent external references previously mapped with respect to the coordinate frame independent of the work vehicle, wherein the location and/or orientation of the subject camera within the coordinate frame independent of the work vehicle may be calculated, and further wherein the location and/or orientation of the subject camera relative to the work vehicle may be calculated, for example via fusion of the inputs from the camera with inputs from one or more other cameras (particularly previously calibrated cameras) of sensors 112, 114, 116 and with respect to the previously defined values.

In an embodiment, a location and/or orientation of the subject camera may already have been retrievably stored, wherein expected image parameters associated with the persistent external references may be generated based on the stored information. As previously noted, a calibration mode as disclosed herein may be suspended if the persistent external references do not satisfy threshold conditions such as maintaining a straight and unbroken trajectory for a sufficient period of time, which may enable the reliable generation of expected image parameters during forward motion of the work vehicle. If actual image parameters do not match the expected image parameters, this may indicate that the stored location and/or orientation for the subject camera require adjustment, or that other calibration parameters for the subject camera require adjustment if the stored location and/or orientation are deemed to be correct, either of which may be provided for example via fusion of the various camera inputs and data analysis to calculate calibration parameters as needed to arrive at the expected image parameters, or in other words to align the actual output values from the subject camera with expected output values from the subject camera based on the persistent external references within the coordinate frame independent of the work vehicle.

Calibration parameters may for example relate to information regarding the location, orientation, displacement, or the like, and may further relate to information inferred from frame by frame observations of persistent external references, of which equivalent frame by frame observations may be available from other sensors at different perspectives, each of which may be used for mapping image parameters from captured images to a desired coordinate frame, alone or further compensating for, e.g., environmental or mechanical external factors.

In an embodiment as noted above, the actual input values (e.g., image parameters) from the subject camera may be compared to expected input values (e.g., image parameters) based at least on a determined orientation of the work vehicle via the sensors 114. In other embodiments, the actual input values (e.g., image parameters) from the subject camera may additionally or in the alternative be compared to expected input values (e.g., image parameters) based at least on a stored orientation of the subject camera relative to respective stored orientations for each of one or more other cameras.

In an embodiment, rather than relying entirely on dynamic mapping of the persistent external references by the perception sensors 116, the method 400 may include retrieving or otherwise obtaining a previously determined map identifying the one or more persistent external references in the coordinate frame independent of the work vehicle. Upon converting mapped parameters associated with the one or more persistent external references into the coordinate frame associated with the work vehicle, the method 400 may further include confirming that the dynamically mapped parameters in step 440 align with the converted parameters from the stored map. During the calibration mode in at least step 450, the method 400 according to this embodiment further includes determining a location and/or orientation of the subject sensor to align inputs corresponding to the one or more persistent external references received from images captured by the subject sensor with the converted parameters from the stored map.

Even after the conditions have initially been satisfied in steps 430 and 440, and step 450 has been initiated to determine the one or more position characteristics (e.g., camera angle relative to the work vehicle) for the camera to be calibrated, the method 400 may further include in step 460 determining that either or both of the conditions are no longer satisfied, or that the previous determination that the conditions had been satisfied was erroneous. For example, the incline of the ground surface may change, the work vehicle may reorient itself during operation, or the crop rows may become lost, based on continuing inputs from the respective sensors 112, 114, 116, in which case the method 400 may suspend step 450 and return to step 430 or step 440 until all of the precedent conditions are once again determined to be satisfied.

Alternatively, the precedent conditions may continue to be deemed satisfactory, but the controller 120 (and/or equivalent component in the cloud server network 220 or remote computing device 320) may determine that the inputs being used to calculate the camera position characteristics lack sufficient precision in step 470. The controller 120 may accordingly require additional inputs from the same camera and other sensors 112, 114, 116 until sufficient precision has been identified, or may require inputs from further sensors, for example directing a reorientation of the camera or one or more other sensors to provide additional inputs.

Once the camera angle (and/or other position characteristic) relative to the work vehicle has been determined as the work vehicle travels across the ground surface, and accordingly the camera to vehicle calibration has substantially been completed, the method 400 may continue in step 480 by adjusting one or more parameters associated with the camera in storage. Calibration parameters may for example be adjusted in storage on or in association with the camera itself, in association with the controller, or both, depending for example on where the relevant image processing is performed. Other calibration parameters may relate entirely to the position characteristics themselves, further dictating where the parameters are stored for relevance to future use.

If multiple cameras have been identified for calibration, for example in step 420, the method 400 may continue in step 490 by moving on to the next camera and returning to step 450. In some embodiments, the calibration mode may be performed simultaneously for each of a number of uncalibrated cameras.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A method of automatically calibrating sensors on a work vehicle, the method comprising:
   during operation of the work vehicle having a plurality of sensors located thereon, each of the plurality of sensors having one or more of a stored location and a stored orientation relative to the work vehicle, automatically determining, via first inputs from one or more of the plurality of sensors, an orientation of a ground surface across which the work vehicle travels relative to an orientation of the work vehicle, and automatically mapping, via second inputs from one or more of the plurality of sensors, one or more persistent external references to a coordinate frame associated with the work vehicle;
   at least upon determining that the orientation of the ground surface and the mapped one or more persistent external references satisfy one or more specified conditions,
   automatically initiating for a first sensor a vehicle to sensor calibration mode comprising:
   receiving actual inputs from the first sensor; and selectively adjusting one or more parameters of the first sensor based on the mapped one or more persistent external references with respect to the actual inputs from the first sensor;
   wherein selectively adjusting one or more parameters of the first sensor comprises adjusting one or more calibration settings associated with the first sensor to align the actual inputs and the expected inputs.

2. The method of claim 1, wherein,
   the first sensor is a camera;
   the first sensor is one of the plurality of sensors; and
   the vehicle to sensor calibration mode for the first sensor comprises:
   comparing the actual inputs from the first sensor to corresponding expected inputs based on the one or more of the stored location and the stored orientation for the first sensor; and
   selectively adjusting the one or more parameters of the first sensor based at least in part on a difference between the actual inputs and the expected inputs.

3. The method of claim 2, wherein the vehicle to sensor calibration mode is automatically initiated further upon determining a new location of the first sensor.

4. The method of claim 2, wherein the vehicle to sensor calibration mode is automatically initiated further upon determining a new orientation of the first sensor.

5. The method of claim 2, wherein selectively adjusting one or more parameters of the first sensor comprises adjusting the one or more of the stored location and the stored orientation of the first sensor to align the actual inputs and the expected inputs.

6. The method of claim 2, wherein the actual inputs from the first sensor are compared to expected inputs based at least on a stored orientation of the first sensor relative to respective stored orientations for each of one or more other sensors of the plurality of sensors.

7. The method of claim 2, wherein the actual inputs from the first sensor are compared to expected inputs based at least on an orientation of the work vehicle.

8. The method of claim 1, comprising: retrieving a stored map identifying the one or more persistent external references in a coordinate frame independent of the work vehicle; converting parameters associated with the one or more persistent external references into the coordinate frame associated with the work vehicle; confirming that dynamically mapped parameters associated with the one or more persistent external references via the second inputs align with the converted parameters from the stored map; and during the calibration mode, determining a location and/or orientation of the first sensor to align inputs corresponding to the one or more persistent external references received from the first sensor with the converted parameters from the stored map.

9. The method of claim 1, wherein the orientation of the ground surface is automatically determined by fusing the first inputs from: one or more sensors configured to detect relative depth parameters corresponding to the ground surface; and one or more sensors configured to detect an orientation of the work vehicle in the coordinate frame independent of the work vehicle.

10. The method of claim 9, wherein the one or more specified conditions to be satisfied comprise a flatness of the ground surface.

11. The method of claim 9, wherein the one or more persistent external references comprise a crop row extending along a trajectory parallel to a direction of travel of the work vehicle.

12. The method of claim 11, wherein the one or more specified conditions to be satisfied comprise a duration of persistence for the one or more persistent external references.

13. A work vehicle comprising:
a plurality of sensors located on the work vehicle;
a controller functionally linked to each of the plurality of sensors and to data storage having stored thereon information, for each of the plurality of sensors, corresponding to one or more of a location and an orientation relative to the work vehicle;
the controller configured, during operation of the work vehicle, to
automatically determine, via first inputs from one or more of the plurality of sensors, an orientation of a ground surface across which the work vehicle travels relative to an orientation of the work vehicle, and
automatically map, via second inputs from one or more of the plurality of sensors, one or more persistent external references to a coordinate frame associated with the work vehicle;
the controller further configured, at least upon determining that the orientation of the ground surface and the mapped one or more persistent external references satisfy one or more specified conditions, to automatically initiate for a first sensor a vehicle to sensor calibration mode comprising:
receiving actual inputs from the first sensor; and
selectively adjusting one or more parameters of the first sensor based on the mapped one or more persistent external references with respect to the actual inputs from the first sensor,
wherein selectively adjusting one or more parameters of the first sensor comprises adjusting one or more calibration settings associated with the first sensor to align the actual inputs and the expected inputs.

14. The work vehicle of claim 13, wherein:
the first sensor is a camera; and the first sensor is one of the plurality of sensors; and
the vehicle to sensor calibration mode for the first sensor comprises:
comparing the actual inputs from the first sensor to corresponding expected inputs based on the one or more of the stored location and the stored orientation of the first sensor; and
selectively adjusting one or more parameters of the first sensor based at least in part on a difference between the actual inputs and the expected inputs.

15. The work vehicle of claim 13, wherein selectively adjusting one or more parameters of the first sensor comprises adjusting one or more of the stored location and the stored orientation of the first sensor to align the actual inputs and the expected inputs.

16. The work vehicle of claim 13, wherein the controller is configured to:
retrieve a stored map identifying the one or more persistent external references in a coordinate frame independent of the work vehicle;
convert parameters associated with the one or more persistent external references into the coordinate frame associated with the work vehicle;
confirm that dynamically mapped parameters associated with the one or more persistent external references via the second inputs align with the converted parameters from the stored map; and
during the calibration mode, to determine a location and/or orientation of the first sensor to align inputs corresponding to the one or more persistent external references received from the first sensor with the converted parameters from the stored map.

17. The work vehicle of claim 13, wherein the controller is configured to automatically determine the orientation of the ground surface by fusing the first inputs from:
one or more sensors configured to detect relative depth parameters corresponding to the ground surface; and
one or more sensors configured to detect an orientation of the work vehicle in the coordinate frame independent of the work vehicle.

18. A system for automatically calibrating sensors on a work vehicle, the system comprising:
one or more processors functionally linked to a plurality of sensors located on the work vehicle, and to data storage having stored thereon respective information for each of the plurality of sensors corresponding to one or more of a stored location and a stored orientation relative to the work vehicle;
wherein the one or more processors are configured during operation of the work vehicle to execute the performance of operations comprising:
automatically determining, via first inputs from one or more of the plurality of sensors, an orientation of a ground surface across which the work vehicle travels relative to an orientation of the work vehicle, and
automatically mapping, via second inputs from one or more of the plurality of sensors, one or more persistent external references to a coordinate frame associated with the work vehicle;
wherein the one or more processors are further configured, at least upon determining that the orientation of the ground surface and the mapped one or more persistent external references satisfy one or more specified conditions, to automatically initiate for a first sensor a vehicle to sensor calibration mode comprising:
receiving actual inputs from the first sensor, and selectively adjusting one or more parameters of the first sensor based on the mapped one or more persistent external references with respect to the actual inputs from the first sensor;
wherein selectively adjusting one or more parameters of the first sensor comprises adjusting one or more calibration settings associated with the first sensor to align the actual inputs and the expected inputs.

\* \* \* \* \*